United States Patent [19]
Keane et al.

[11] Patent Number: 5,117,170
[45] Date of Patent: May 26, 1992

[54] MOTOR CONTROL CIRCUIT FOR A SIMULATED WEIGHT STACK

[75] Inventors: Martin A. Keane, Arlington Heights; William H. Englehardt, Wood Dale, both of Ill.

[73] Assignee: Life Fitness, Franklin Park, Ill.

[21] Appl. No.: 511,830

[22] Filed: Apr. 20, 1990

Related U.S. Application Data

[63] Continuation of Ser. No. 107,970, Oct. 13, 1987, abandoned, which is a continuation-in-part of Ser. No. 812,277, Dec. 23, 1985, abandoned.

[51] Int. Cl.$^5$ .......................... A63B 21/24; H02D 5/16
[52] U.S. Cl. ...................................... 318/646; 318/434; 318/439; 482/5; 482/91; 482/132; 482/900
[58] Field of Search ............... 318/434, 287, 588, 621, 318/678, 632; 388/823; 272/DIG. 6, 116–146, 129

[56] References Cited

U.S. PATENT DOCUMENTS

| | | | |
|---|---|---|---|
| 3,582,746 | 6/1971 | Nye | 318/434 |
| 3,716,770 | 2/1973 | Habisohn | 318/431 |
| 3,848,467 | 11/1974 | Flavell . | |
| 3,868,554 | 2/1975 | Konrad | 318/434 |
| 3,902,480 | 9/1975 | Wilson | 272/129 |
| 4,150,324 | 4/1979 | Naito | 318/434 |
| 4,184,678 | 1/1980 | Flavell et al. . | |
| 4,191,913 | 3/1980 | Arnold et al. | 318/663 |
| 4,268,782 | 5/1981 | Kawada et al. | 318/434 |
| 4,354,676 | 10/1982 | Ariel | 272/179 |
| 4,366,420 | 12/1982 | Omae et al. | 318/338 |
| 4,412,158 | 10/1983 | Jefferson | 318/287 |
| 4,513,381 | 4/1985 | Houser et al. | 318/345 H |
| 4,544,154 | 10/1985 | Ariel | 272/129 |
| 4,563,003 | 1/1986 | Bugallo et al. . | |
| 4,569,518 | 2/1986 | Fulks . | |
| 4,599,545 | 7/1986 | Moriki | 318/599 |
| 4,602,373 | 7/1986 | Dorfman | 272/129 |
| 4,638,226 | 1/1987 | Damiano et al. | 318/345 R |
| 4,710,865 | 12/1987 | Higomura | 318/592 X |
| 4,967,862 | 11/1990 | Pong et al. | 180/19.3 |

FOREIGN PATENT DOCUMENTS 2157578 4/1984 United Kingdom .

*Primary Examiner*—Paul Ip
*Attorney, Agent, or Firm*—Jenner & Block

[57] ABSTRACT

A control for a DC motor coupled to a user interface to provide a counterforce which simulates a weight stack in an exercise machine. The control includes a position transducer coupled to the motor to provide a signal proportional to the displacement of the user interface. In one embodiment a circuit is provided to generate a control signal which follows the displacement signal when it is less than a maximum torque signal, the control voltage following maximum torque signal when it is less than the displacement signal. In a second embodiment a microprocessor control unit is responsive to the displacement signal to provide a control signal for the motor which starts increasing from a first value when the user interface is displaced an initial amount and which continues gradually increasing to a maximum value as the user interface is moved through a given displacement from the initial displacement. The control signal is used to soft start the motor such that the counterforce provided by the motor simulates a weight stack supported by a spring over small displacements of the user interface.

34 Claims, 3 Drawing Sheets

MOTOR CONTROL CIRCUIT FOR A SIMULATED WEIGHT STACK

CROSS-REFERENCE TO RELATED APPLICATION

This application is a continuation of application Ser. No. 07/107,970, filed Oct. 13, 1987, now abandoned, which is a continuation-in-part of U.S. Pat. application Ser. No. 812,277, filed Dec. 23, 1985, now abandoned.

TECHNICAL FIELD

The present invention relates to a control for a DC motor coupled to a user interface to simulate a weight stack in an exercise machine and more particularly to a control for a DC motor simulating a weight stack initially supported by a spring over small displacements of the user interface.

BACKGROUND OF THE INVENTION

Exercise machines are known in which various devices are used to simulate a weight stack to provide a counterforce to a user of the machine. One known exercise machine employs a hydraulic cylinder to apply a counterforce to an exercise bar engaged by the user wherein a computer controls the force applied by the hydraulic cylinder. Another known type of exercise machine employs an alternator or generator coupled to an electrical load resistor to apply a counterforce to the user. In this type of machine, as the rotational velocity of the alternator or generator increases, so does the counterforce felt by the user. These known types of exercise machines are very costly and do not adequately simulate a weight stack.

To provide an economical exercise machine, it is desirable to use a DC motor to provide a counterforce which simulates a weight stack. Attempts have been made to control a DC motor to apply maximum force against the user as soon as the user interface or exercise bar is displaced. Such attempts have included applying a maximum control voltage to the DC motor immediately upon sensing displacement of the user interface. However, because the control voltage goes from zero to a maximum value almost instantaneously, such controls are very unstable. Further, such exercise machines typically dissipate the same amount of power when the user interface is at rest as when the interface is at its maximum displacement.

SUMMARY OF THE INVENTION

In accordance with the present invention, the disadvantages of prior exercise machines as discussed above have been overcome. The exercise machine of the present invention includes a DC motor for providing a counterforce to a user interface such as an exercise bar and a control for soft starting the DC motor so that the motor simulates a weight stack initially supported by a spring over small displacements of the user interface.

A first embodiment of the control includes a position transducer for sensing the displacement of the rotor or armature of the DC motor and thus the displacement of the user interface to provide a voltage proportional thereto. The first embodiment of the control also includes a potentiometer for providing a maximum torque voltage which represents the maximum counterforce to be provided by the DC motor to simulate the total weight of the weight stack. A circuit is provided which forms a control voltage from the minimum of the displacement voltage and the maximum torque voltage such that the control voltage increases in proportion with the displacement voltage to the level of the maximum torque voltage. The control voltage is used to generate an armature current for the DC motor, the armature current being proportional to the control voltage in order to soft start the DC motor and provide a counterforce which gradually increases to a maximum value when the user interface is initially displaced.

In a second embodiment of the present invention, the soft start control is provided by a microprocessor control unit. In this embodiment, a shaft position sensor is employed to detect the displacement of the DC motor's shaft and thus, the displacement of the user interface coupled to the shaft. The microprocessor control is responsive to the shaft position sensor to provide a motor control signal which starts increasing from a first value when the interface is displaced an initial amount and which continues gradually increasing to a maximum soft start value as the user interface is moved through a given displacement from the initial displacement, the counterforce provided by the motor following the control signal. In this embodiment, the soft start need not begin as soon as the user interface has been displaced, but may begin when the interface has been displaced a small initial amount such as 6° or less. By offsetting the starting point of the soft start control signal from zero displacement of the user interface, power dissipation when the interface is near its rest position is zero or kept to a minimum.

The soft start control of the present invention overcomes the problems of instability that have occurred in prior exercise machines with DC motors without impairing the "feel" of the machine. More particularly, by tailoring the soft start control to simulate a very short spring so that it is effective only over short displacements of the user interface on the order of one-half of an inch or 20° or less, the effect of the soft start cannot be felt by the user. Because the effect of the soft start is not felt by a user it appears to the user that the maximum force is applied as soon as the interface is displaced to simulate more exactly a real weight stack. Further, because the soft start provides zero force, or a near zero force at or near zero displacement of the user interface, the power dissipation when the interface is at rest is zero or a minimum value.

These and other objects and advantages of the invention, as well as details of an illustrative embodiment, will be more fully understood from the following description and from the drawing.

BEST MODE FOR CARRYING OUT THE INVENTION

Figure 1:
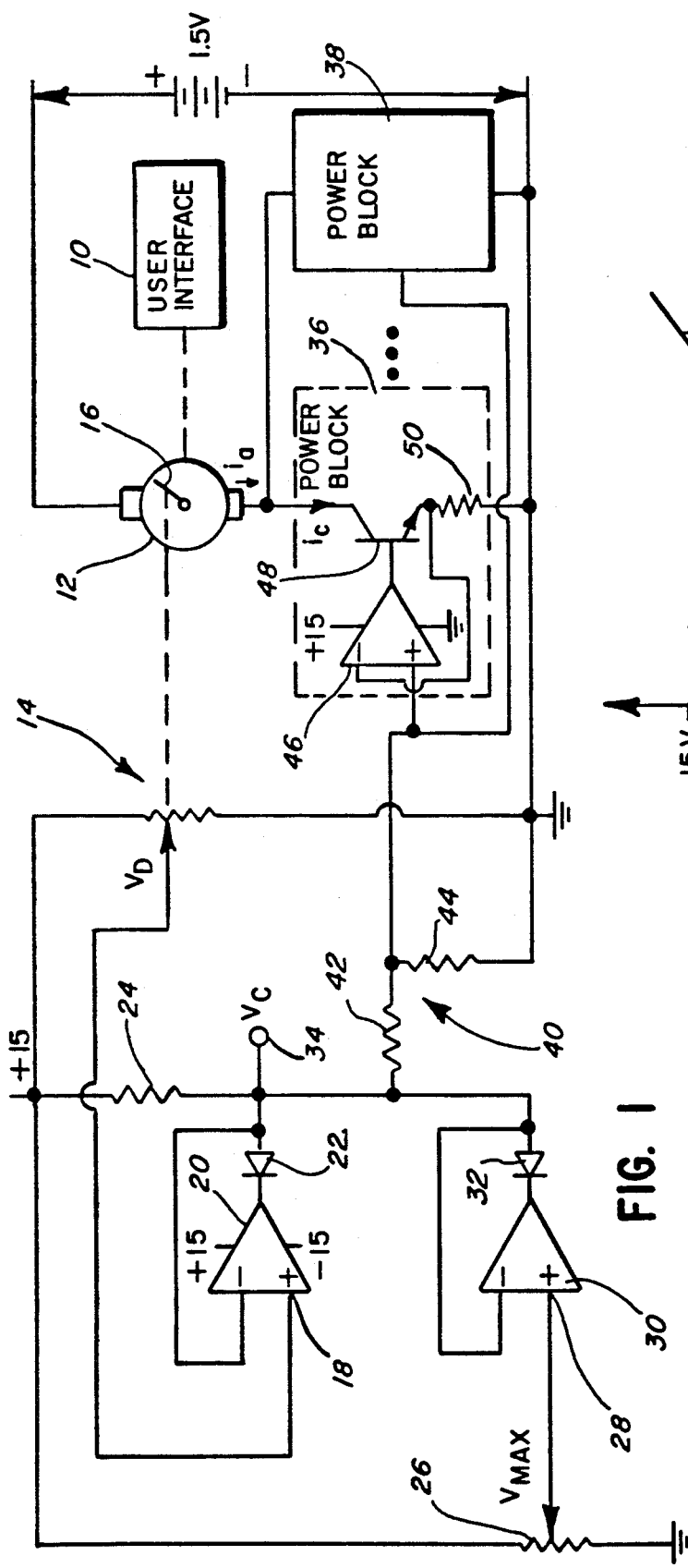
FIG. 1 is a schematic diagram of the DC motor control circuit for an exercise machine according to a first embodiment of the present invention.

The exercise machine of a first embodiment of the present invention, as shown in FIG. 1, includes a user interface 10 such as an exercise bar or the like which is engaged by a user of the machine to exert a force. The user interface 10 is coupled to a DC motor 12 which exerts a counterforce against the user. The DC motor 12 is controlled by the remaining portion of the circuit shown in FIG. 1 to provide a counterforce which simulates a weight stack initially supported by a spring over very small displacements of the user interface.

Figure 2:
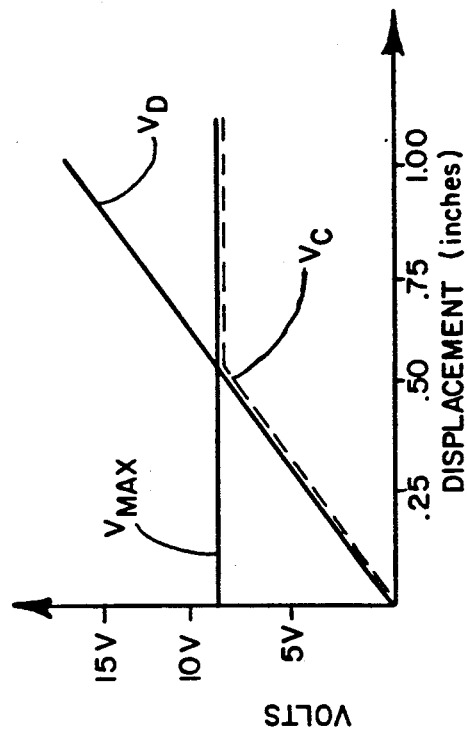
FIG. 2 is a graph illustrating how the control voltage generated for the DC motor of FIG. 1 varies as a function of displacement of the user interface.

A position transducer 14 is provided to sense the position of the armature or rotor 16 of the DC motor 12. The position transducer 14 provides a voltage, $V_D$, as shown in FIG. 2, which is proportional to the displacement of the rotor 16 and thus proportional to the displacement of the user interface 10. The displacement voltage $V_D$ is coupled to the noninverting input terminal 18 of an operational amplifier 20, which is configured as a voltage follower. The output of the operational amplifier 20 is coupled to the cathode of a diode 22, the anode of which is coupled to +15 volts through a 1k $\Omega$ resistor 24.

A potentiometer 26, which is coupled to +15 volts, provides a maximum torque voltage, $V_{max}$, which represents the maximum counterforce to be provided by the DC motor 12 to simulate the total weight of the weight stack. By varying the setting of the potentiometer 26, the maximum counterforce or total weight of the stack simulated by the DC motor 12 can be changed. The maximum torque voltage, $V_{max}$, is applied to the noninverting input terminal 28 of an operational amplifier 30 which is also configured as a voltage follower. The output of the operational amplifier 30 is coupled to the cathode of a diode 32, the anode of which is coupled to +15 volts through the resistor 24 to control the maximum value of a control voltage, $V_C$, generated at node 34. The control voltage $V_C$ follows the lesser of the displacement voltage $V_D$ and the maximum torque voltage $V_{max}$ so that it increases gradually in proportion with $V_D$ to the level of $V_{max}$.

The control voltage $V_C$ is coupled to a plurality of power blocks through a voltage divider 40 comprised of a 9.1k $\Omega$ resistor 42 and a 910 $\Omega$ resistor 44. For simplicity, only two power blocks 36 and 38 out of a plurality of power blocks, numbering on the order of ten, for example, are shown in FIG. 1. The power blocks are connected in parallel and coupled to the DC motor 12 to control the armature current, $i_a$, of the motor. Each power block, as shown for block 36, includes an operational amplifier 46 having a noninverting input terminal to which is applied a reduced control voltage from the voltage divider 40. The output of each operational amplifier is coupled to the base of a transistor 48, the emitter of which is connected to ground through a 0.1 $\Omega$ resistor 50. The transistor 48 may be a Darlington transistor or a power FET. When current from the operational amplifier 46 is applied to the base of the transistor 48, a collector current $i_c$ is provided which is proportional to the control voltage $V_C$. The armature current $i_a$ of the DC motor 12 is equal to the sum of the collector currents $i_c$ from each of the power blocks 36 through 38. That is, $i_a = n i_c$, where n is equal to the number of power blocks. The armature current $i_a$ is proportional to the control voltage $V_C$ so that it increases gradually over small displacements of the user interface 10 to soft start the DC motor 12.

When a user initially engages the interface 10 to exert a force against the force provided by the DC motor 12, the position transducer generates a voltage $V_D$, as shown in FIG. 2 which gradually increases as a function of the displacement of the user interface. When $V_D$ is less than the maximum torque voltage $V_{max}$, the control voltage $V_C$ applied to the voltage divider 40 follows $V_D$. The power blocks 36 through 38, in turn, generate an armature current which gradually increases in proportion to $V_D$ when $V_D < V_{max}$ to soft start the DC motor 12. During this period, the DC motor 12 provides a counterforce which simulates a weight stack initially supported by a spring. When the user interface 10 is displaced linearly about one-half of an inch as shown in FIG. 2, the displacement voltage, $V_D$, equals the maximum torque voltage, $V_{max}$. As the user interface 10 is displaced more, $V_D$, rises above $V_{max}$. Because $V_C$ follows the minimum of $V_D$ and $V_{max}$, when the user interface is displaced one-half of an inch or more, $V_C$ remains equal to the constant maximum torque voltage, $V_{max}$. The power blocks respond to the maximum control voltage to provide the maximum armature current to the DC motor 12 to cause the motor to provide a counterforce simulating the total weight of the stack without the support of a spring. Because the DC motor is soft started, the control circuit shown in FIG. 1 is very stable as well as economical.

Figure 3:
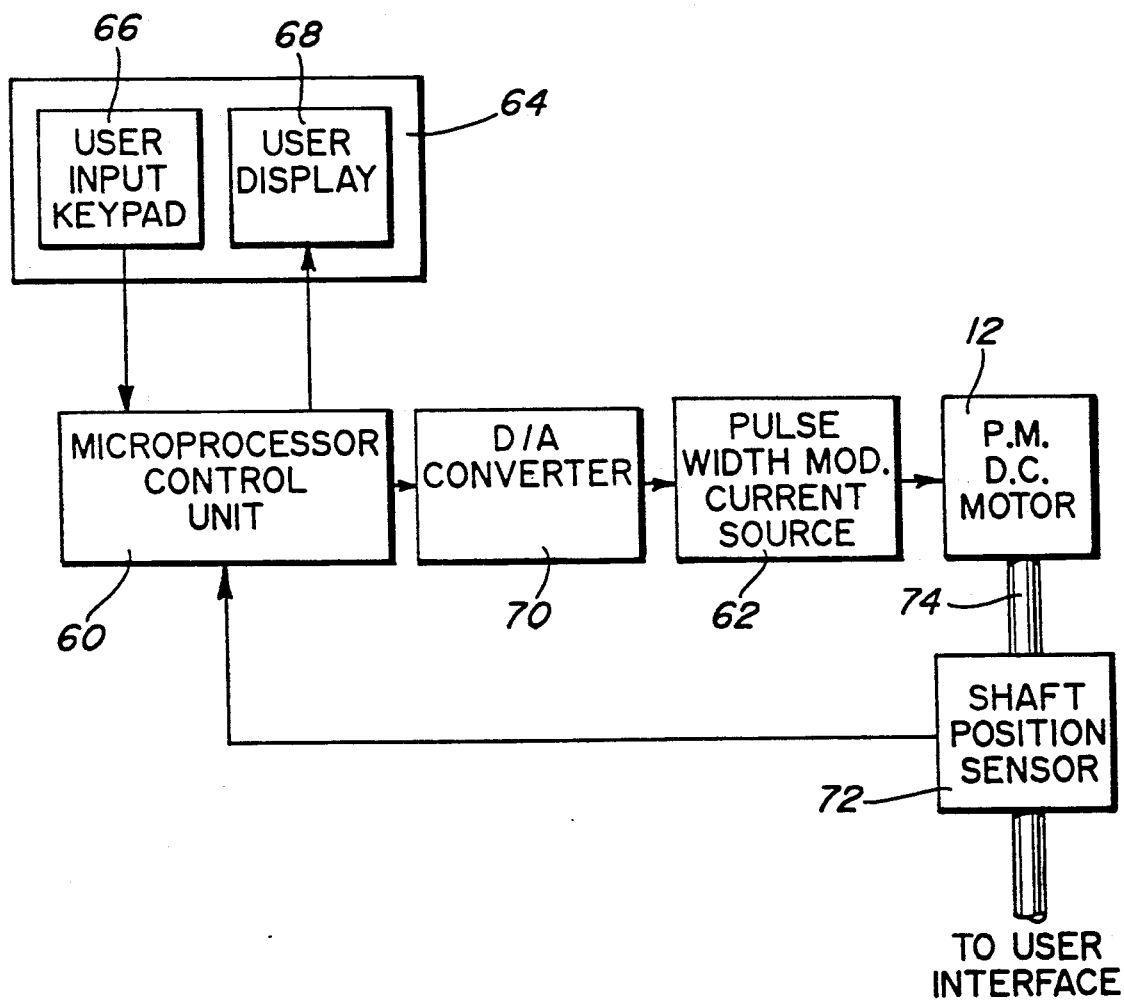
FIG. 3 is a block diagram of the DC motor control for an exercise machine according to a second embodiment of the present invention.

In a second embodiment of the present invention, the soft start control for the DC motor 12 is provided by a microprocessor control unit 60 shown in FIG. 3. As shown therein, the motor 12 is a permanent magnet DC motor. The current through the armature of the motor 12 is determined by the output of a current source 62, the motor 12 providing a torque, and thus a force opposing the user which is proportional to the motor armature current. The current source 62 is preferably a pulse width modulated current source to prevent problems of power dissipation.

The microprocessor control unit 60 is coupled to a keyboard/display unit 64 having an input keyboard 66 operable by a user to set the magnitude of the opposition force provided by the motor and having a display 68 for providing visual feedback to the user. The microprocessor control unit 60 is responsive to the user input keypad 66 and to a shaft position sensor 72 to provide to a digital-to-analog (D/A) convertor 70 a digital signal representing the force to be applied by the motor 12 as discussed in detail below. The D/A converter 70 converts the digital force signal from the microprocessor control unit 60 to an analog force signal or voltage which is applied to the current source 62 to regulate the armature current of the motor 12 and thus, the force produced by the motor. The shaft position sensor 72 includes a pair of optical sensors coupled to the shaft 74 of the motor 12 to produce a pair of pulse trains, the number of pulses of which represents the position of the shaft and the phase difference of which represents the direction of travel of the shaft. Because the shaft is coupled to the user interface, the output of the sensor 72 provides a displacement signal, formed of the two pulse trains, which represents the displacement of the user interface.

Figure 4:
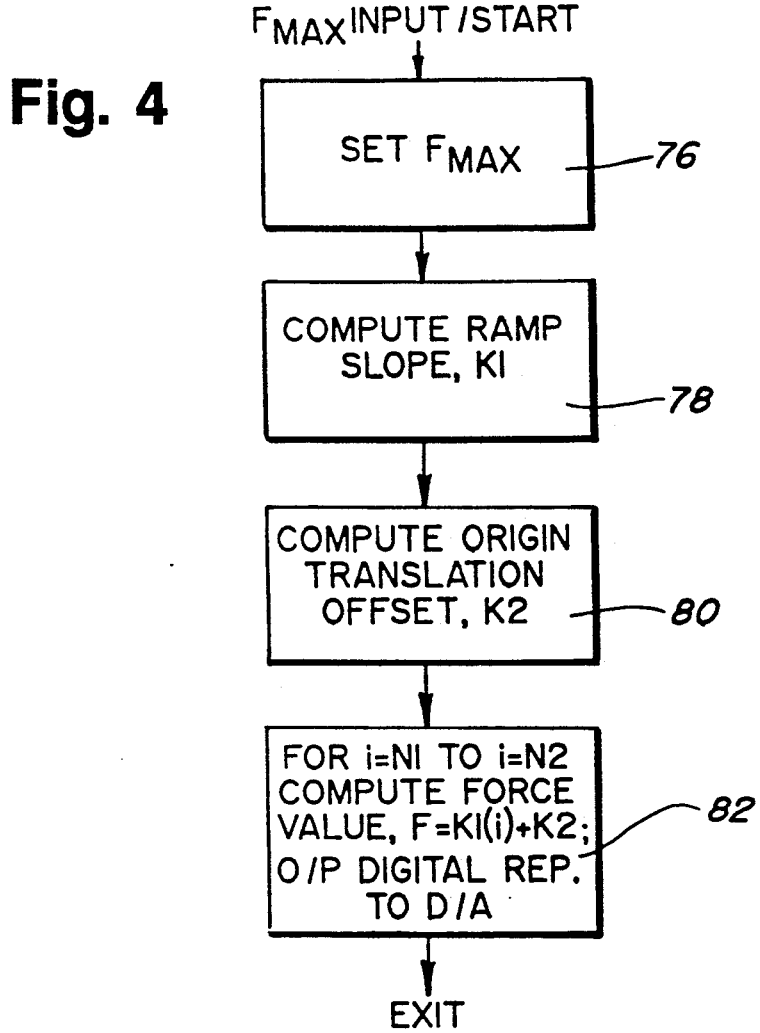
FIG. 4 is a flow chart illustrating the soft start routine implemented by the microprocessor control unit shown in FIG. 3.
Figure 5:
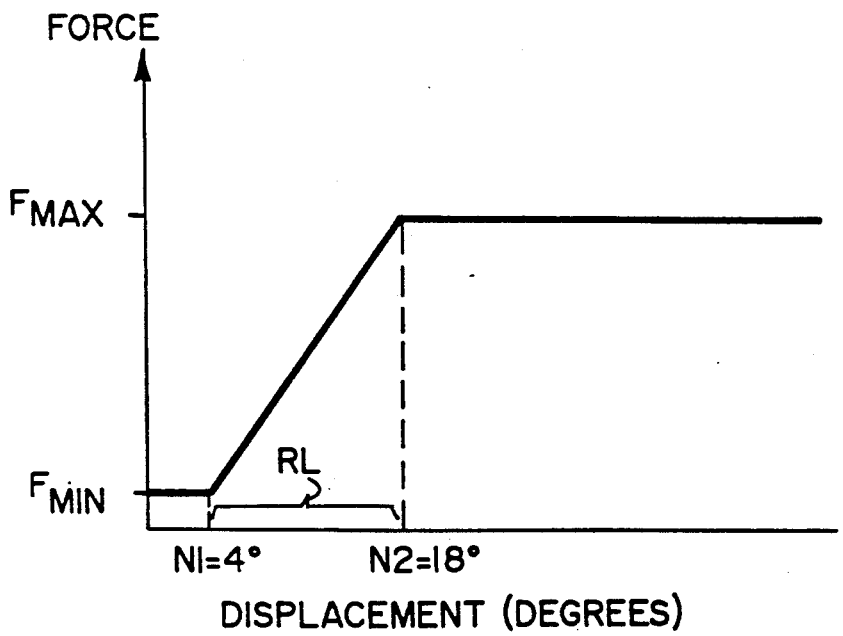
FIG. 5 is a graph illustrating the soft start force applied by the DC motor control of FIG. 3.

The microprocessor control unit 60 operates according to a flow chart illustrated in FIG. 4 to generate a control signal for controlling the motor 12 to provide the counterforce illustrated in FIG. 5. As shown in FIG. 5, $F_{MIN}$ is the minimum force, if any, necessary to maintain the user interface in its rest position and/or to maintain the coupling between the user interface and motor shaft taut when the interface is at rest. The constant N1 is the offset for the starting point of the soft start ramp. More particularly, N1 is the initial displacement through which the user interface must be moved for the motor control signal and counterforce provided by the motor to start increasing. Although N1 may be set equal to zero, offsetting the starting point of the soft start ramp, N1, from zero displacement ensures that power dissipation will be zero when the user interface is at rest if $F_{MIN}$ is equal to zero and that power dissipation will at least be kept to a minimum if $F_{MIN}$ is not equal to zero. The constant RL represents the displacement through which the user interface moves between the start of the soft start ramp at N1 and the end of the ramp at N2. Further, the X-axis of FIG. 5 represents displacement in degrees for a user interface displaceable along an arc.

When a user inputs the maximum force he wishes to encounter via the keypad 66 and starts the exercise machine, the microprocessor control unit 60 as shown in FIG. 4 at block 76 sets the variable $F_{MAX}$ equal to the input value. At block 78, the microprocessor control unit 60 computes the slope, K1, of the soft start ramp, K1 being equal to $$\frac{F_{MAX} - F_{MIN}}{RL}.$$

Thereafter, at block 80, the microprocessor control unit 60 computes the origin translation offset, K2, wherein K2 is equal to $$\frac{(F_{MIN})(N2) - (F_{MAX})(N1)}{RL}.$$

The microprocessor control unit 60 at block 82 computes the force values for each incremental displacement, i, for i=N1 to i=N2 wherein the force value at a given displacement i is equal to (K1)(i)+K2. For each value of i, the microprocessor control unit 60 outputs to the D/A converter 70 a digital representation of the value necessary to cause the current source 62 to control the DC motor 12 to generate the counterforce computed for that value of i at block 82.

It has been found that for values of N1 equal to 6° or less and values of RL of 14° or less, the effect of the soft start control of the present invention is not felt by a user. Because the effect of the soft start is not felt by a user, the user believes the maximum force is applied as soon as he displaces the user interface as in a real weight stack. These values of N1 and RL are such as to cause the DC motor 12 with the soft start control to simulate a weight stack supported by a very short spring that is not discernible by a user.

We claim:

1. An exercise machine having a user interface engaged by the user for simulating a weight stack comprising:
   a DC motor coupled to the user interface to exert a counterforce that simulates the weight of a weight stack;
   means for sensing the displacement of the user interface to provide a displacement signal proportional thereto; and
   means responsive to said displacement signal for controlling said motor to provide a force which starts increasing from a first value at a rest position and gradually increases to said counterforce in response to movement of the interface through an initial displacement from said rest position.

2. An exercise machine as recited in claim 1 wherein said first value represents a force necessary to maintain the user interface in said rest position.

3. An exercise machine as recited in claim 1 wherein said initial displacement is less than or equal to one half inch from said rest position.

4. An exercise machine as recited in claim 2 wherein said initial displacement is less than or equal to one half inch from said rest position.

5. An exercise machine having a user interface engaged by the user for simulating a weight stack comprising:
   a DC motor coupled to the user interface to exert a counterforce that simulates the weight of a weight stack;
   means for sensing the displacement of the user interface to provide a displacement signal proportional thereto; and
   means responsive to said displacement signal for soft starting said DC motor to cause the motor to provide a force which simulates a weight stack initially supported by a short spring.

6. The exercise machine of claim 5 wherein said soft start means includes means for providing to said motor a control signal which increases to a maximum value in proportion with said displacement signal when the user interface is initially displaced to control the DC motor to provide said force which increases gradually to said counterforce over a short displacement of the user interface from a rest position.

7. The exercise machine of claim 6 wherein said user interface is displaceable along a line and said short displacement is on the order of one half of an inch.

8. The exercise machine of claim 6 wherein said user interface is displaceable along an arc and said short displacement is not greater than 20°.

9. An exercise machine having a user interface engaged by the user comprising:
   selection means for permitting the user to select a counterforce;
   a DC motor coupled to the user interface to exert said counterforce against the user;
   means for sensing the displacement of the user interface to provide a displacement signal proportional thereto;
   means responsive to said displacement signal and said selection means for providing a control signal which increases to a maximum value in proportion with said displacement signal, said control signal being coupled to said DC motor to control the motor to exert a force which increases gradually to said counterforce at said maximum value over a short displacement of said user interface from a rest position.

10. The exercise machine of claim 9 wherein said control signal providing means includes:
    a first voltage follower to the input of which is applied said displacement signal to provide a voltage which is proportional to the displacement of the user interface from said rest position;

a second voltage follower to the input of which is applied a signal representing said counterforce to be exerted by said motor; and means coupled to the outputs of said first and second voltage followers for selecting the minimum voltage output from the followers as said control signal.

11. An exercise machine having a user interface engaged by the user comprising:
a DC motor coupled to the user interface to exert a preselected maximum counterforce against the user, said motor having an armature the rotation of which represents the displacement of said user interface;
means for sensing the rotation of said armature to provide a displacement signal proportional thereto; and
means responsive to said displacement signal and coupled to said DC motor for providing an armature current which increases to a maximum value in proportion with said displacement signal to control said motor to provide a counterforce which is proportional to said armature current and equals said maximum counterforce at said maximum value when the user interface has been displaced a short distance from a rest position.

12. The exercise machine of claim 11 wherein said armature current providing means provides said armature current which increases to said maximum value over said short displacements of said user interface from said rest position on the order of one half of an inch for an interface displaceable along a line.

13. The exercise machine of claim 11 wherein said armature current providing means provides said armature current which increases to said maximum value over said short displacements of said interface on the order of 20° or less of the rotation of said armature.

14. The exercise machine of claim 11 wherein said armature current providing means additionally provides a minimum value of said armature current to control said DC motor to provide a minimum counterforce when the user interface is in said rest position.

15. The exercise machine of claim 14 wherein said armature current providing means additionally provides said minimum value of said armature current for a first portion of said short distance from said rest position and then increase said armature current to said maximum value in proportion with said displacement value over the remaining portion of said short distance.

16. The exercise machine of claim 15 wherein said short distance is equivalent to approximately 18° of rotation of said armature.

17. The exercise machine of claim 16 wherein said first portion of said short distance is equivalent to approximately 4° of rotation of said armature.

18. An exercise machine for simulating a weight stack comprising:
a user interface displaceable from a rest position;
input means for permitting a user to select a weight to be simulated;
displacement means for generating a displacement signal representing the displacement of said user interface;
a DC motor operatively coupled to said user interface; and
control means operatively connected to said input means, said displacement means and said D.C. motor for applying a first current to said D.C. motor to generate a maximum force on said user interface to simulate said selected weight and wherein said control means additionally includes soft start means for increasing said armature current from a minimum value to said first value over an initial displacement of said user interface from said rest position.

19. The machine of claim 18 wherein said initial displacement is approximately one-half inch.

20. The machine of claim 18 wherein said minimum current value is approximately zero.

21. The machine of claim 18 wherein said soft start means simulates a short spring over said initial displacement.

22. The machine of claim 18 wherein said current increases linearly from said minimum value to said first value over said initial displacement.

23. The machine of claim 18 wherein said soft start means additionally maintains said current at said minimum value for an offset portion of said initial displacement and then increases said current to said first value over the remaining portion of said initial displacement.

24. The machine of claim 23 wherein said minimum current applied to said DC motor is sufficient to generate sufficient force on said user interface to retain said user interface in said rest positions.

25. The machine of claim 23 wherein the slope of said increase of said current over said remaining portion of said initial displacement is equal to:

$$\frac{F_{MAX} - F_{MIN}}{RL}$$

where $F_{MAX}$ is said maximum force, $F_{MIN}$ is the minimum force generated on said user interface by said minimum value of the current and RL is said remaining portion of said initial displacement.

26. The machine of claim 25 wherein said control means includes means for computing said offset portion of the initial displacement in response to a value of $F_{MAX}$ input by the user into said input means.

27. The machine of claim 23 wherein said initial displacement is approximately one-half inch.

28. The machine of claim 27 wherein said offset portion is between 20% and 30% of said initial displacement.

29. An exercise machine for simulating a weight stack comprising:
a user interface displaceable from a rest position;
input means for permitting a user to select a weight to be simulated;
displacement means for generating a displacement signal representing the displacement of said user interface;
a DC motor operatively coupled to said user interface; and
control means operatively connected to said input means, said displacement means and said DC motor for applying a first current to said DC motor to generate a maximum force on said user interface to simulate said selected weight and wherein said control means additionally includes soft start means for increasing said armature current from a minimum value to said first value over an initial displacement of said user interface from said rest position, said soft start means additionally able to maintain said current at said minimum value for an offset portion of said initial displacement and then increase said current to said first value over the remaining portion of said initial displacement.

30. The machine of claim 29 wherein said minimum current applied to said DC motor is sufficient to generate sufficient force on said user interface to retain said user interface in said rest positions.

31. The machine of claim 29 wherein the slope of said increase of said current over said remaining portion of said initial displacement is equal to:

$$\frac{F_{MAX} - F_{MIN}}{RL}$$

where $F_{MAX}$ is said maximum force, $F_{MIN}$ is the minimum force generated on said user interface by said minimum value of the current and RL is said remaining portion of said initial displacement.

32. The machine of claim 31 wherein said control means includes means for computing said offset portion of the initial displacement in response to a value of $F_{MAX}$ input by the user into said input means.

33. The machine of claim 29 wherein said initial displacement is approximately one-half inch.

34. The machine of claim 33 wherein said offset portion is between 20% and 30% of said initial displacement.

* * * * *